(12) United States Patent
McCarren

(10) Patent No.: US 6,879,239 B2
(45) Date of Patent: Apr. 12, 2005

(54) THERMOSTAT ASSEMBLY

(75) Inventor: Gregory M. McCarren, Tryon, NC (US)

(73) Assignee: Woodlane Environmental Technology, Inc., Columbus, NC (US)

( * ) Notice: Subject to any disclaimer, the term of this patent is extended or adjusted under 35 U.S.C. 154(b) by 0 days.

(21) Appl. No.: 10/394,319

(22) Filed: Mar. 21, 2003

(65) Prior Publication Data

US 2003/0189966 A1 Oct. 9, 2003

Related U.S. Application Data

(60) Provisional application No. 60/370,944, filed on Apr. 8, 2002.

(51) Int. Cl.$^7$ .......................... H01H 37/04; H01H 37/54
(52) U.S. Cl. ....................... 337/380; 337/343; 337/333; 374/205
(58) Field of Search ................................. 337/333, 334, 337/343, 380, 382, 393, 394; 374/205, 208

(56) References Cited

U.S. PATENT DOCUMENTS

| | | | | |
|---|---|---|---|---|
| 3,194,927 A | * | 7/1965 | Place ........................ | 337/387 |
| 3,575,645 A | * | 4/1971 | Doversberger et al. ..... | 257/173 |
| 3,594,675 A | * | 7/1971 | Willson .................... | 337/140 |
| 3,636,622 A | | 1/1972 | Schmitt ..................... | 29/622 |
| 3,839,694 A | * | 10/1974 | Du Rocher et al. ........ | 337/382 |
| 3,967,502 A | | 7/1976 | Moran ....................... | 73/352 |
| 4,166,995 A | * | 9/1979 | Pecker et al. .............. | 337/390 |
| 4,268,812 A | * | 5/1981 | Satterlee ................... | 337/380 |
| 4,354,094 A | | 10/1982 | Massey et al. ............. | 219/306 |
| 4,400,679 A | * | 8/1983 | Snider ....................... | 337/382 |
| 4,446,451 A | * | 5/1984 | Boulanger ................. | 337/380 |
| 4,529,616 A | * | 7/1985 | Smythe ..................... | 427/456 |
| 4,577,176 A | * | 3/1986 | Bayer ........................ | 337/394 |
| 4,628,295 A | * | 12/1986 | Yasuda et al. ............ | 337/354 |
| 4,875,983 A | * | 10/1989 | Alota et al. ............... | 205/104 |
| 4,887,062 A | * | 12/1989 | Bletz ........................ | 337/299 |
| 4,892,996 A | | 1/1990 | Mertes ...................... | 219/301 |
| 4,954,802 A | * | 9/1990 | Wasserstrom et al. ..... | 337/380 |
| 5,368,813 A | * | 11/1994 | Hobbs et al. .............. | 420/425 |
| 5,420,398 A | * | 5/1995 | Petri et al. ................ | 219/505 |
| 5,421,988 A | * | 6/1995 | Ando et al. ............... | 205/155 |
| 5,574,421 A | | 11/1996 | Hickling ................... | 337/343 |
| 5,692,453 A | | 12/1997 | Vore et al. ................ | 116/315 |
| 5,758,407 A | | 6/1998 | Hickling ................... | 29/622 |
| 6,114,941 A | * | 9/2000 | Scott ......................... | 337/332 |
| 6,210,824 B1 | | 4/2001 | Sullivan et al. ........... | 429/53 |
| 6,256,456 B1 | | 7/2001 | DeSantis ................... | 392/452 |
| 6,480,091 B1 | * | 11/2002 | Scott et al. ............... | 337/332 |
| 6,707,372 B2 | * | 3/2004 | Davis et al. ............... | 337/376 |
| 2002/0014234 A1 | | 2/2002 | McCarren .................. | 126/515 |

OTHER PUBLICATIONS

Thermodisc® "Sensors and Controls Selection Guide," Bulletin No. SCSG–0600. Date unknown.
Grainger catalog, p. 339. Date unknown.

\* cited by examiner

Primary Examiner—Anatoly Vortman
(74) Attorney, Agent, or Firm—Carter Schnedler & Monteith, P.A.

(57) ABSTRACT

A thermostat assembly for opening and closing an electrical circuit in response to the temperature within a measurement region. The thermostat assembly includes a relatively low-cost bimetal disc thermostat, but may be used in circumstances where temperature or other conditions exceed the design limitations of the bimetal disc thermostat. An elongated probe has a distal end arranged to extend at least to the measurement region, and a heat-disseminating end in thermal contact with a thermally-conductive outer housing surface of the bimetal disc thermostat.

10 Claims, 4 Drawing Sheets

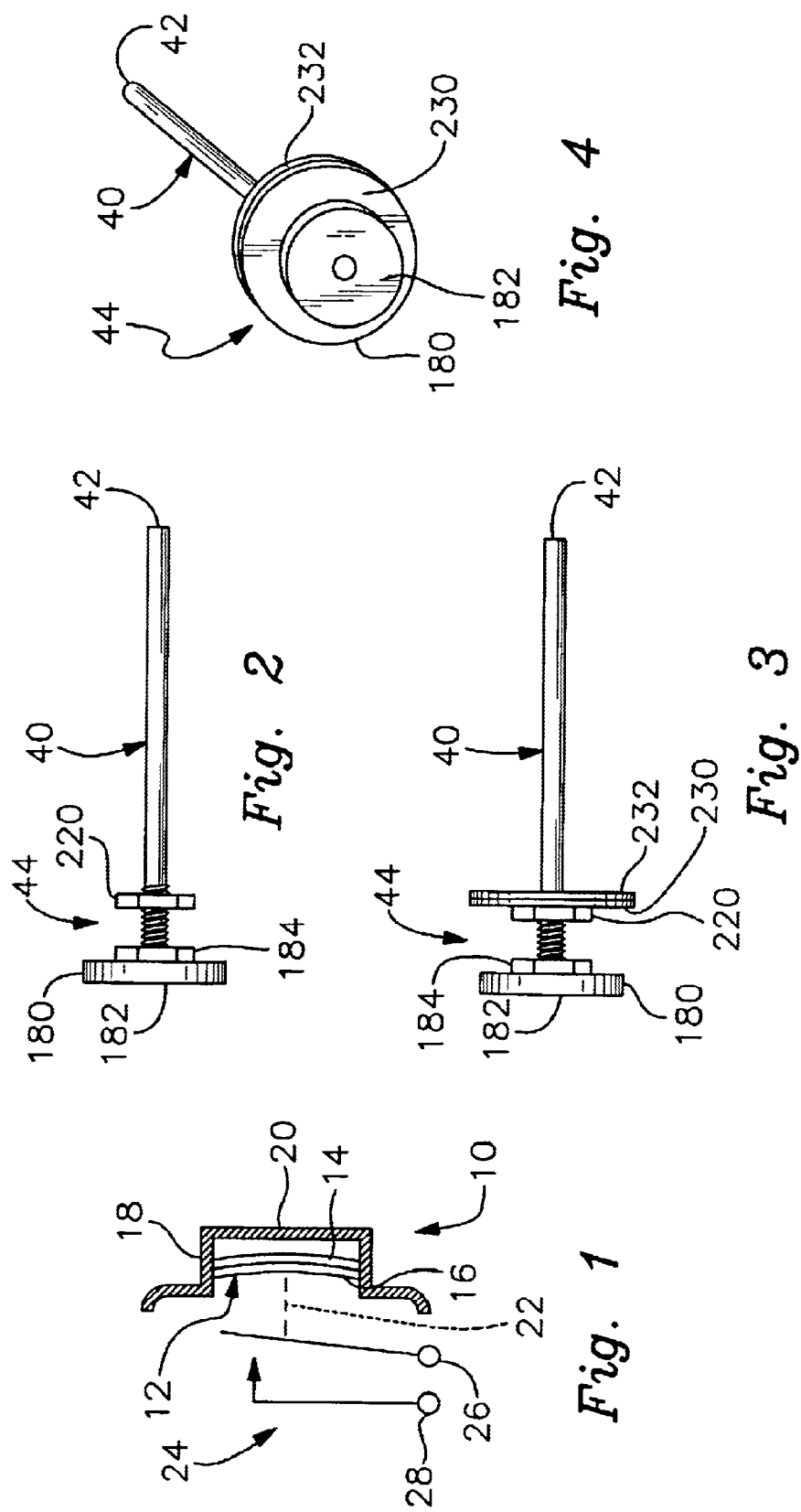

THERMOSTAT ASSEMBLY

CROSS-REFERENCE TO RELATED APPLICATION

The benefit of U.S. Provisional patent application Ser. No. 60/370,944, filed Apr. 8, 2002, is claimed.

BACKGROUND OF THE INVENTION

Bimetal alloy snap disc-type thermostats, such as those manufactured by Therm-O-Disc, Incorporated, provide a reliable and inexpensive method of opening and closing an electrical circuit in response to changes in surface or ambient temperatures. Changes in the thickness and composition of the bimetal alloy disc allow the thermostats to be adjusted to open and close at specified temperatures. Bimetal disc thermostats are widely used in home appliances and HVAC applications to control the flow of electrical current to fans, heating elements and a variety of other devices.

A limitation of a bimetal disc thermostat is that the bimetal disc is stressed and the thermostat eventually fails when subjected to temperatures above approximately 650° F. (343° C.). As a result, prior to the subject invention, more expensive sensors and switches have been required for higher temperature applications. An example is sensing the temperature of a flue conveying hot exhaust gas flow from a fireplace in a ventilation system such as is disclosed in McCarren Patent Application Publication No. US 2002/0014234 titled "Ventilation System and Method."

In addition, there are a number of environments that may be within the temperature limitations of bimetal disc thermostats, but which for other reasons are unsuitable for the direct exposure of the thermostat, such as a corrosive environment, moisture or other adverse conditions.

SUMMARY OF THE INVENTION

In an exemplary embodiment, a thermostat assembly for opening and closing an electrical circuit in response to the temperature within a measurement region includes a bimetal disc thermostat which has a thermally-conductive outer housing surface. In addition, there is an elongated probe having a distal end arranged to extend at least to the measurement region, and having a heat-disseminating end in thermal contact with the thermally-conductive outer housing surface.

BRIEF DESCRIPTION OF THE DRAWINGS

FIG. 1 is a schematic representation of a normally open bimetal disc thermostat;

FIG. 2 is a side elevational view of an elongated probe including a thermally-conductive heat-disseminating element at its heat-disseminating end;

FIG. 3 is a side elevational view of the probe of FIG. 2, additionally including a pair of thermally-insulating washers;

FIG. 4 is a three-dimensional view of the probe and washers of FIG. 3;

DETAILED DESCRIPTION

Figure 5:
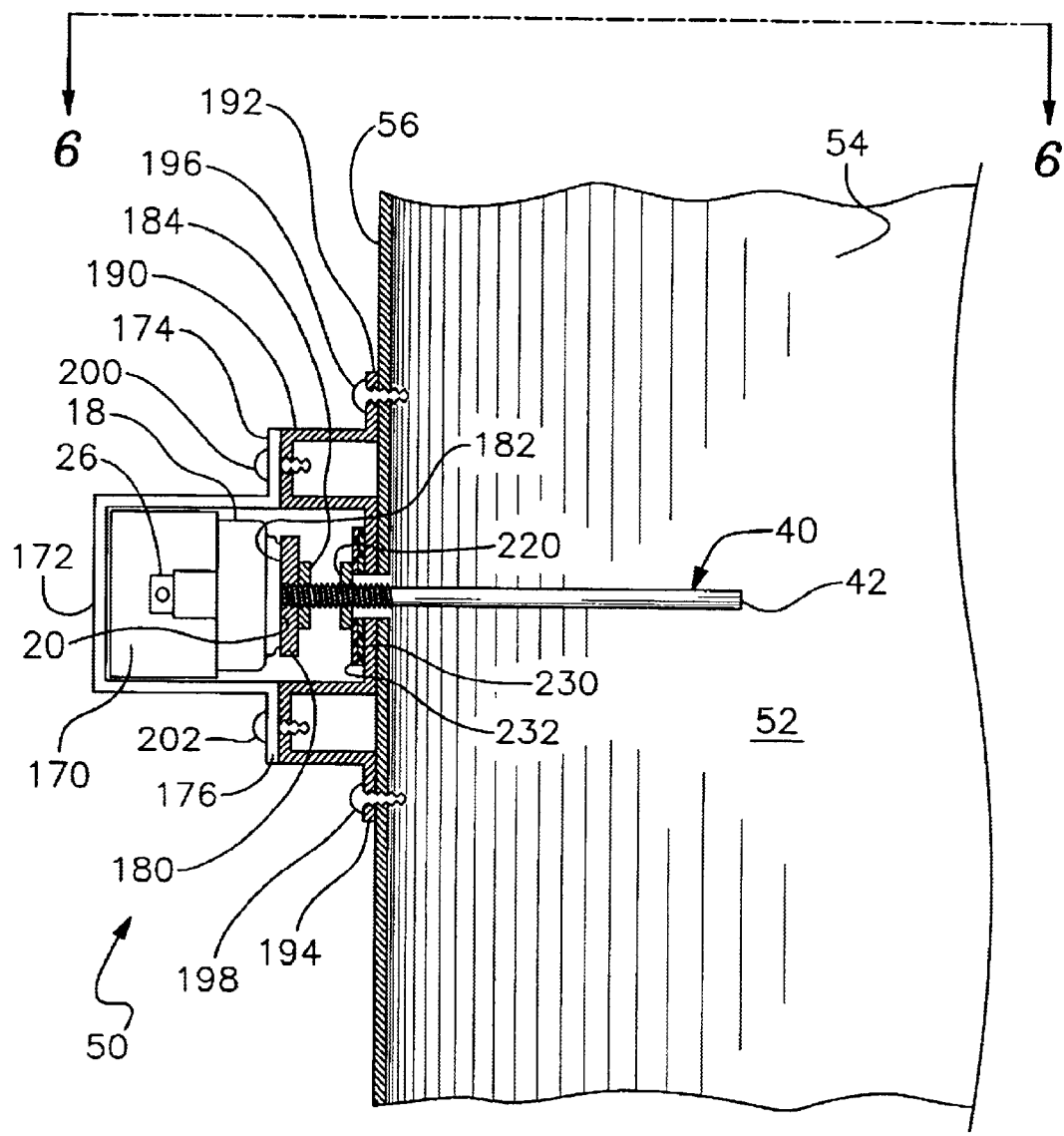
FIG. 5 is a side elevational view, partially in section, showing a thermostat assembly embodying the invention installed for opening and closing an electrical circuit in response to the temperature within a measurement region.

Referring first to FIG. 1, somewhat schematically represented is a bimetal disc thermostat, generally designated 10. The bimetal disc thermostat 10 is commercially available and, for example, may comprise a Type 60T ¾ inch disc multi-purpose control thermostat or a Type 49T ¾ inch disc general purpose high temperature control thermostat, both available from Therm-O-Disc Incorporated, 1320 South Main Street, Mansfield, Ohio 44907-0538.

very briefly, the bimetal disc thermostat 10 includes a bimetallic disc 12 as the temperature sensing element. Thus, the bimetallic disc 12 incorporates two metal layers 14 and 16 which are bonded together. The bimetallic disc 12 is mounted within a thermostat housing 18 (only a portion of which is shown in FIG. 1 for convenience of illustration) having a thermally-conductive outer housing surface 20 which serves a temperature-sensing point.

The bimetallic disc 12 is dish shaped, and "pops" over center, from a concave to a convex shape, when the temperature of the bimetallic disc 12 passes a predetermined temperature for which it is calibrated. Through a mechanical linkage represented by dash line 22, the bimetallic disc 12 operates switch contacts 24 connected to terminals 26 and 28 for opening and closing an electrical circuit including the switch contacts 24.

The particular bimetal disc thermostat 10 depicted has normally-open switch contacts 24. The switch contacts 24 and thus the associated electrical circuit are closed when the temperature of the bimetallic disc 12 reaches the temperature for which it is calibrated.

Such a bimetal disc thermostat can be ordered from its manufacturer in particular calibration temperatures within the range of 80° F. to 550° F. (27° C. to 228° C.), with override temperatures up to 625° F. (330° C.). At higher temperatures, above approximately 650° F. (343° C.), the bimetal disc thermostat 10 is subject to failure, and the bimetal disc thermostat 10 no longer functions, even when later cooled down.

Bimetal disc thermostats 10 are well suited and widely employed for their design purpose, notwithstanding their relatively low cost. However, they are not suitable for higher temperature applications. This unsuitability is particularly exacerbated in applications such as the ventilation system disclosed in the above-referenced McCarren Patent Application Publication No. US 2002/0014234, where it may be desired to close the switch contacts 24 and energize a blower motor (described hereinbelow with reference to FIG. 7) when the temperature of flue gas within a fireplace flue reaches 110° F. (43° C.), and subsequently open the switch contacts 24, thus turning off the blower motor when the flue surface temperature drops below 95° F. (35° C.), and yet withstand an operating temperature potentially as high as 2000° F. (1094° C.). In other words, the ON/OFF temperature calibration range is far removed from the maximum temperature the region or surface the temperature of which it is desired to be sensed may reach.

Thus, stating the problem more generally, it would be desirable to employ a relatively low-cost bimetal disc thermostat in circumstances where temperature or other conditions exceed the design limitations of the thermostat.

In overview, in embodiments of the invention, a probe 40 comprising a thermally-conductive material has a distal end 42 within or contacting a measurement region. By way of example, the probe 40 is made of copper, with a corrosion resistant coating, such as chromium. The other end of the probe 40 is a heat-disseminating end 44, and is in thermal contact with the thermally-conductive outer housing surface 20 of the bimetal disc thermostat 10. Heat from the measurement region is thus conducted along the probe 40 to the outer housing surface 20 of the thermostat 10. In the process of conducting heat, a measurable heat loss and therefore temperature decrease occurs along the length of the probe 40. Varying the thermal conductivity, length and other characteristics of the probe 40 can control, as a matter of design, the amount of heat lost. A controlled (by design) drop in temperature can thus be achieved to bring the conducted heat to the thermostat 10 at a temperature that is within the design limitations of the thermostat 10. Measurement and control (by design) of the heat lost between the measurement region at the distal end 42 of the probe 40 and the heat-disseminating end 44 of the probe allow a suitably-calibrated bimetal disc thermostat 10 to be specified. Accordingly, the bimetal disc thermostat 10 can be made to sense and respond to temperatures that are well in excess of its design limitations. Embodiments of the invention may also be employed to avoid exposure of the thermostat 10 to a corrosive environment, moisture or other adverse conditions.

An embodiment of the invention is described in greater detail below with reference to FIGS. 2–4, which generally show the probe 40 in isolation, as well as with reference to FIGS. 5 and 6 which show a thermostat assembly 50 embodying the invention and including the probe 40 in its installed condition. FIG. 7 shows a particular application of the thermostat assembly 50.

Figure 6:
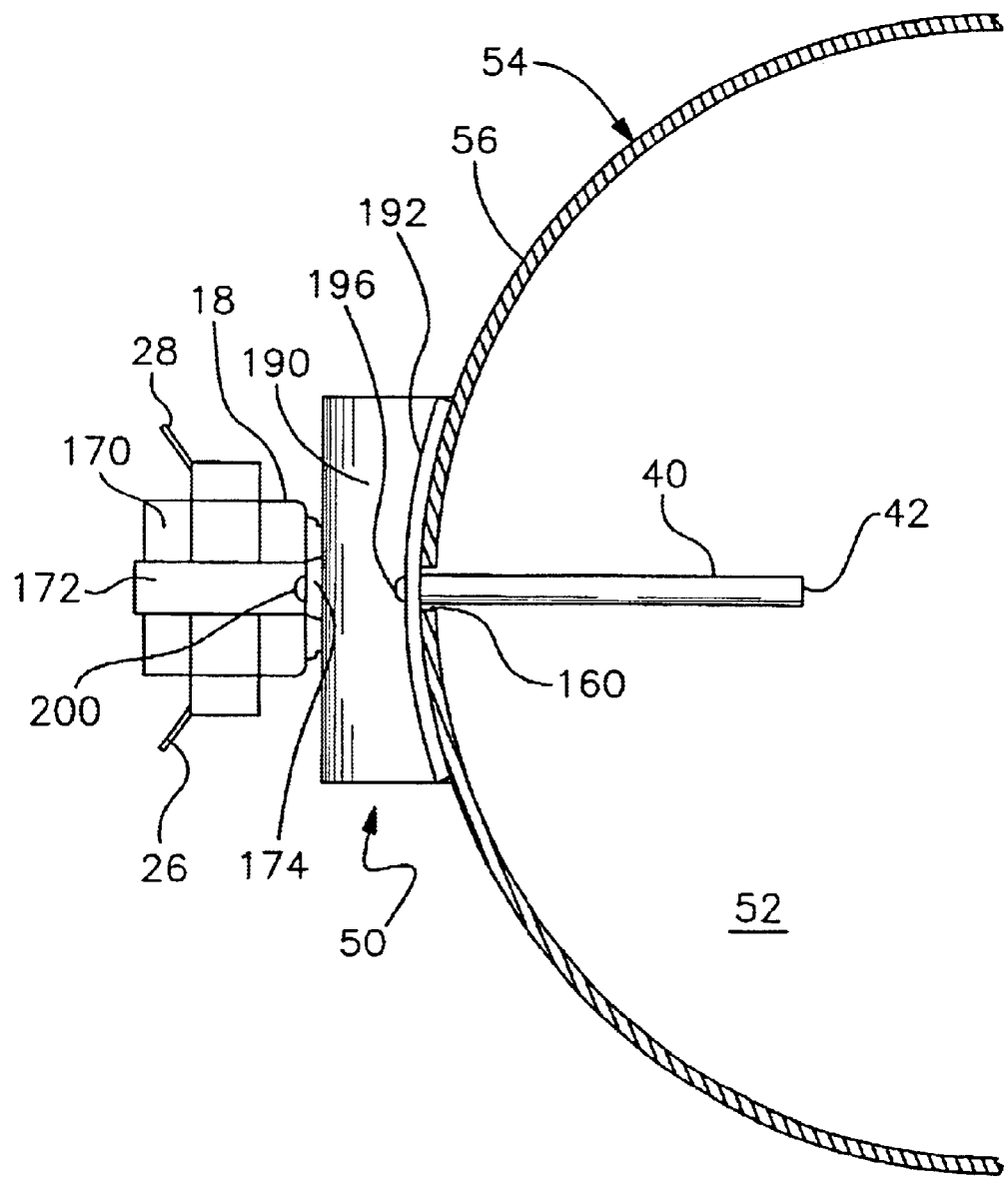
FIG. 6 is a partial plan view taken on line 6—6 of FIG. 5.
Figure 7:
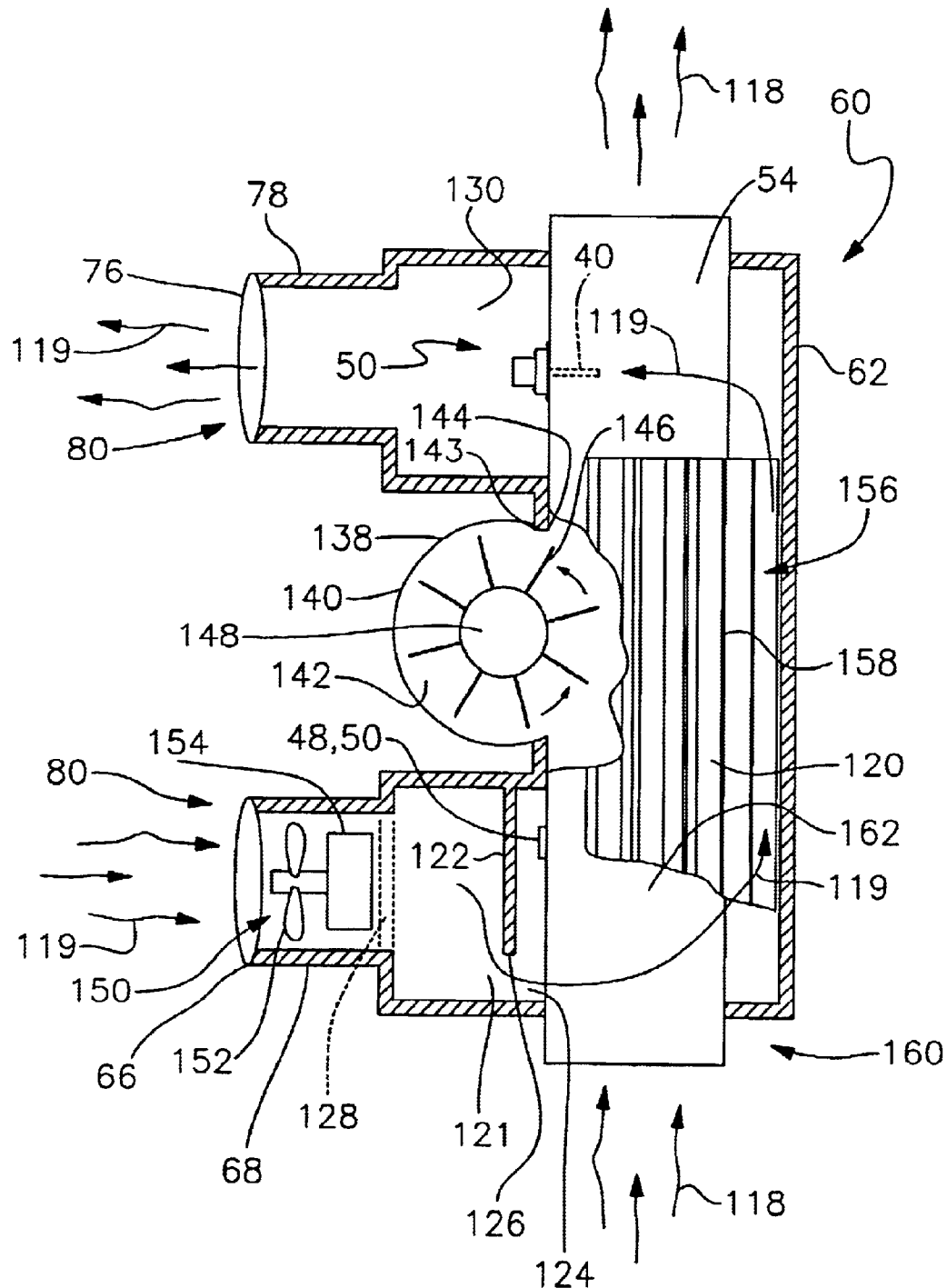
FIG. 7, as an example showing a specific application of an embodiment of the invention, shows the interior structure of the heat recovery ventilator device disclosed in the above-referenced Patent Application Publication No. US 2002/0014234, modified to include a thermostat assembly embodying the invention.

A measurement region 52 is represented in FIGS. 5 and 6. An electrical circuit including the switch contacts 24 is to be opened and closed in response to the temperature within the measurement region 52. Although the measurement region 52 is illustrated in FIGS. 5 and 6 as a volume into which the probe 40 extends, in other embodiments the measurement region 52 may as well comprise a surface with which the distal end 42 of the probe 40 is in thermal contact.

In the particular embodiment of FIGS. 5 and 6, the measurement region 52 more particularly comprises the interior of a fireplace flue 54 having a flue wall 56, again such as is disclosed in the above-referenced McCarren Patent Application Publication No. US 2002/0014234 titled "Ventilation System and Method." This particular environment is shown more particularly in FIG. 7, which is based on one of the figures of Publication No. US 2002/0014234, modified to include a thermostat assembly 50 embodying the subject invention.

Thus FIG. 7 shows the interior structure of a fireplace heat recovery ventilator device 60 which is connected in series with a fireplace exhaust gas flue connection (not shown). The device 60 includes an outer housing 62 surrounding a flue section comprising the flue 54. Supported by the housing 62 are an inlet connection 66 duct section 68 and an outlet connection 76 duct section 78 comprising elements of a ventilation channel 80.

In FIG. 7, arrows 118 represent the flow of exhaust gas flow through the flue section 54. Arrows 119 represent the flow of ventilation airflow through inlet and outlet connections 66 and 76, and through a heat exchange chamber 120.

Ventilation air entering the device 60 through the inlet connection 66 is delivered first to an entry chamber 121 adjacent the lower end of the ventilator device 60. The chamber 121 is defined in part by an interior partition wall 122 that has an opening 124 along the lower end 126 thereof for introducing outside air into the lower end of the heat exchange chamber 120. Within the entry chamber 121 is a replaceable air filter 128. In a similar manner, the ventilator device 60 includes adjacent its upper end an exit chamber 130 that receives warmed ventilation air which has passed upwardly through the heat exchange chamber 120, and which exits past the adjustable damper 112 to the outlet connection 76.

A motor-driven draft inducer 138 includes a housing 140 defining an impeller chamber 142 which is open at one end. The outer housing 62 is formed such that, at the point where the draft inducer 138 is mounted, the outer housing 62 contacts the flue section 54 and conforms to the cylindrical surface thereof. Matching rectangular apertures 143 and 144 are formed in the outer housing 62 and flue section 54, respectively. The draft inducer 138 housing 140 is attached in a gas-tight manner to the flue section 54, over the rectangular apertures 143 and 144. Fasteners (not shown), which may be the same fasteners that attach the draft inducer 138, hold the outer housing 62 of the ventilator device 60 and the flue section 54 tightly together around the perimeter of the apertures 143 and 144. Accordingly, exhaust gas within and exhausted through the flue section 54 is in direct communication with the interior of the impeller chamber 142, but is otherwise confined so as to not escape into the building interior, either directly or through communication with the ventilation channel 80. Rotating within the impeller chamber 142 is a vaned impeller 146, driven by an electric motor 148. Vanes of the impeller 146 project partially into the flue section 54 so as to induce a draft when the draft inducer 138 is activated by energizing the electric motor 148, causing the vaned impeller 146 to rotate.

A motor-driven blower 150 within the inlet duct section 68 includes an impeller 152 in the representative form of a fan blade 152, driven by an electric motor 154. When the motor-driven blower 150 is activated by energizing the electric motor 154, the fan blade 152 rotates so as to force ventilation airflow through the ventilation channel 80.

For exchanging heat between gas exhausted through the flue section 54 to air conveyed through the ventilation channel 80, a heat exchanger, generally designated 156, is included within the heat recovery ventilator device 60. In the illustrated embodiment, the heat exchanger 156 takes the form of a heat exchange structure 158 attached to the flue section 54 in a manner which provides good thermal contact. The heat exchange structure 158 has a plurality of vertically-extending fins 158 that project into the heat exchange chamber 120 defined by the device 60 housing 62. Ventilation airflow passing through the heat exchange chamber 120 is warmed as it flows past the heat exchange structure 158.

In order to sense the temperature of flue gas conveyed through the flue section 54 (the measurement region), the thermostat assembly embodying the invention is mounted to the flue section 54 wall 56 near the upper end of the fireplace heat recovery ventilator device 60. As described in Patent Application Publication No. US 2002/0014234, when hot flue gas is sensed indicating the presence of a fire in the fireplace (not shown), the switch contacts 24 close, completing a circuit which energizes the motor-driven draft inducer 138 and the motor-driven blower 150.

Referring again to FIGS. 5 and 6, the flue section 54 wall 56 has an aperture 160 through which the probe 40 passes. In the exemplary embodiment, the probe 40 has an exemplary length of approximately two inches, and the flue section 54 has a diameter of approximately eight inches. In addition to the thermostat housing portion 18 shown in FIG. 1 (which housing portion 18 is metal), in FIGS. 5 and 6 the bimetal disc thermostat 10 is shown as it appears from the exterior thereof. The bimetal disc thermostat 10 includes a ceramic portion 170 supporting the terminals 26 and 28. A mounting bracket 172 is part of the thermostat. The mounting bracket 172 includes a pair of mounting flanges or feet 174 and 176, generally in the same plane as the thermostat outer housing surface 20 through which temperature is sensed.

The heat-disseminating end 44 of the probe 40 more particularly comprises a thermally-conducting heat-disseminating element 180 having a heat-disseminating surface 182 which is in thermal contact with the outer housing surface 20 of the bimetal disc thermostat 10. The surface area of the heat-disseminating surface is greater than the cross-sectional area of the probe 40.

In the illustrated embodiment, the heat-disseminating element 180 takes the form of a disc made of aluminum or other conductive material. The disc 180 is drilled and tapped, and the heat-disseminating end 44 of the probe 40 is threaded accordingly. A lock nut 184 prevents loosening of the threaded connection. Alternatively, the probe 40 and heat-disseminating disc 180 can be welded or brazed to each other. As another alternative, the probe 40 including the heat-disseminating element 180 with its heat-disseminating surface 182 can be die-cast or otherwise fabricated from a single piece of metal or other material.

Cooperating with the mounting bracket 72 of the thermostat 10 is an adaptor mounting bracket 190. The adaptor mounting bracket 190 has mounting flanges 192 and 194, curved to match the curvature of the flue wall 54, attached by means of fasteners 196 and 198 to the flue wall 56. The feet 174 and 176 of the mounting bracket 172 are in turn affixed by means of fasteners 200 and 202 to the adaptor mounting bracket 190.

The mounting brackets 172 and 190 cooperate such that the thermally-conductive outer housing surface 20 of the bimetal disc thermostat 10 presses against the heat-disseminating end 44 of the probe 40 and, more particularly, against the heat-disseminating surface 182 of the heat-disseminating element 180.

To resist the force of the thermostat outer housing surface 20 against the heat-disseminating end 44 of the probe 40, an adjustable stop 220 is provided on the probe 40, more particularly in the form of a threaded spacing-adjustment nut 220, engaging the threads on the end of the probe 40. The stop 220 then bears against the outside of the flue wall 56.

The position of the stop 220 along the probe 40 is adjustable for adjustment of the force of the thermostat outer housing surface 20 against the heat-disseminating end 44 of the probe 40 to obtain good thermal contact. In the illustrated embodiment, the nut 220 is simply rotated to effect this adjustment.

In order to thermally isolate the heat-disseminating end 44 from surrounding materials, other than the outer housing surface 20 of the bimetal disc thermostat 10, a pair of thermally-insulating washers 230 and 232, such as mica washers, are stacked and located in between the stop 220 and the flue wall 56.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A thermostat assembly for opening and closing an electrical circuit in response to the temperature within a measurement region, said thermostat assembly comprising:
    a bimetal disc thermostat including a thermally-conductive outer housing surface; and
    an elongated probe of thermally-conductive material having a distal end arranged to extend at least to the measurement region, and a heat-disseminating end spaced from the measurement region in thermal contact with said thermally-conductive outer housing surface.

2. The thermostat assembly of claim 1, wherein said heat-disseminating end comprises a thermally-conductive heat-disseminating element, said heat-disseminating element having a surface area in thermal contact with said thermally-conductive outer housing surface, said surface area being greater than the cross-sectional area of said probe.

3. The thermostat assembly of claim 1, wherein said elongated probe is made of copper with a corrosion resistant coating.

4. The thermostat assembly of claim 3, wherein said corrosion resistant coating comprises chromium.

5. A thermostat assembly for opening and closing an electrical circuit in response to the temperature within a measurement region located on one side of a partition wall having an aperture, said thermostat assembly comprising:
    an elongated probe of thermally-conductive material extending through the aperture to a distal end in thermally conductive relationship with the measurement region;
    said elongated probe having a heat-disseminating end located on the other side of the partition wall and spaced from the measurement region;
    a bimetal disc thermostat including a thermally-conductive outer housing surface;
    a bracket holding said bimetal disc thermostat such that said thermally-conductive outer housing surface presses against said heat-disseminating end of said probe; and
    a stop on said elongated probe near said heat-disseminating end positioned for bearing against the other side of the partition wall resisting the force of the outer housing surface against said heat-disseminating end of said probe.

6. A thermostat assembly for opening and closing an electrical circuit in response to the temperature within a measurement region located on one side of a partition wall having an aperture, said thermostat assembly comprising:
    an elongated probe of thermally-conductive material extending through the aperture to a distal end in thermally conductive relationship with the measurement region;
    said elongated probe having a heat-disseminating end located on the other side of the partition wall;
    a bimetal disc thermostat including a thermally-conductive outer housing surface;
    a bracket holding said bimetal disc thermostat such that said thermally-conductive outer housing surface presses against said heat-disseminating end of said probe; and
    a stop on said elongated probe near said heat-disseminating end positioned for bearing against the other side of the partition wall resisting the force of the outer housing surface against said heat-disseminating end of said probe, the position of said stop along said probe being adjustable for adjustment of the force of said outer housing surface against said heat-disseminating end of said probe.

7. A thermostat assembly for opening and closing an electrical circuit in response to the temperature within a measurement region located on one side of a partition wall having an aperture, said thermostat assembly comprising:

an elongated probe of thermally-conductive material extending through the aperture to a distal end in thermally conductive relationship with the measurement region;

said elongated probe having a heat-disseminating end located on the other side of the partition wall;

a bimetal disc thermostat including a thermally-conductive outer housing surface;

a bracket holding said bimetal disc thermostat such that said thermally-conductive outer housing surface presses against said heat-disseminating end of said probe;

a stop on said elongated probe near said heat-disseminating end positioned for bearing against the other side of the partition wall resisting the force of the outer housing surface against said heat-disseminating end of said probe; and a thermally-insulating washer in between said stop and the partition wall.

8. The thermostat assembly of claim 5, wherein said heat-disseminating end comprises a thermally-conductive heat-disseminating element, said heat-disseminating element having a surface area in thermal contact with said thermally-conductive outer housing surface, said surface area being greater than the cross-sectional area of said probe.

9. The thermostat assembly of claim 5, wherein said elongated probe is made of copper with a corrosion resistant coating.

10. The thermostat assembly of claim 9, wherein said corrosion resistant coating comprises chromium.

* * * * *